Nov. 10, 1953 C. I. PLACE 2,658,402

FLEXIBLE ENDLESS BELT CONSTRUCTION

Original Filed July 21, 1945

INVENTOR,
CHARLES I. PLACE,

BY *Terry & Cohn*
ATTORNEYS.

Patented Nov. 10, 1953

2,658,402

UNITED STATES PATENT OFFICE 2,658,402

FLEXIBLE ENDLESS BELT CONSTRUCTION

Charles I. Place, Norfolk, Conn.

Original application July 21, 1945, Serial No. 606,325, now Patent No. 2,534,679, dated December 19, 1950. Divided and this application October 25, 1950, Serial No. 192,047

2 Claims. (Cl. 74—237)

This invention pertains to improvements in flexible endless belt construction for certain power transmission drives, and more particularly to an improved non-slip, exceptionally quiet flexible belting, possessing high efficiency and marked self cooling characteristics. This application is a division of application Serial No. 606,325, filed July 21, 1945 by this applicant, and now issued as Patent No. 2,534,679.

Flexible driving elements developed in the past, exhibit various deficiencies such as excessive slippage, prohibitive cost, low efficiency and short life, which difficulties are, by present improvements, minimized or eliminated altogether. For example, flat belt drives are notoriously subject to a great deal of slippage, avoided to a large extent by the V-type belt drive that offers more belt surface in direct frictional contact with the pulleys. That remaining degree of slippage is further diminished by the present novel flexible belt, in cooperation with the special pulley construction of the power transmission assembly, the latter forming the claimed subject matter of the parent application hereof. Is is accordingly a major objective of the present improvements, to realize all of the advantages of a V-type belting, and greatly to enhance the non-slip character, the cooling provisions and quietness of operation of prevalent V-belting.

While the novel belt operates equally well with pocketed pulleys of somewhat different construction than those immediately described, it is a preferably construction to illustrate the advantages of the new belting. This belt drive assembly provides two pulleys, either of which may constitute the driving or the driven unit, and which may be of identical construction except for diametral dimensions, pitch and number of pockets. Each pulley has a curvilinear annular channel or belt seat and a plurality of spaced trapezoidal recesses or wells completely separate and independent from one another, and appreciably in excess of the depth of the channel.

The novel flexible belting that cooperates with the pulleys of the parent application hereof, is objectively composed of a highly compressible, porous or cellular rubber or rubber-like material, securely bonded to a thin flat endless sheet metal band or a band of woven or meshed wire. This band is substantially non-stretchable, holding the belting to a uniform length throughout its life of operation. The metal band is an important reinforcing component, because of the low tensile strength of the highly depthwise compressible material comprising the pulley gripping portion. This compressible material immediately beneath the thin reinforcing band is usually of the same width as the band for approximately one-half of its thickness, but the lower gripping portion by preference converges inwardly to form a trapezoidal cross section.

With the belting in position on the pulleys and under tension, any given portion of the belting fills the curvilinear annular channel by being compressed depthwise and expanding laterally, and then flows into the deeper trapezoidal pockets by expanding depthwise and being compressed laterally by the walls of the said pockets as the rubber-like material encounters them. This belt action provides, as an object of the invention, an interfitting relation that provides quiet, efficient, long life operation, and a substantial pulley gripping effect that approximates a positive drive condition obtaining in many types of chain drives, but with higher efficiency and much more quiet operation.

Another object and advantage realized, is improved internal cooling of the belting due to the absorption and expulsion of air by the highly porous material as any given part of the belt is alternately compressed and expanded as it passes into and out of the trapezoidal wells. Therefore, under any reasonable operative load the belting will remain cool.

Other objects and advantages will become apparent as the description progresses and by reference to the drawing of a single advanced embodiment wherein.

Figure 1:
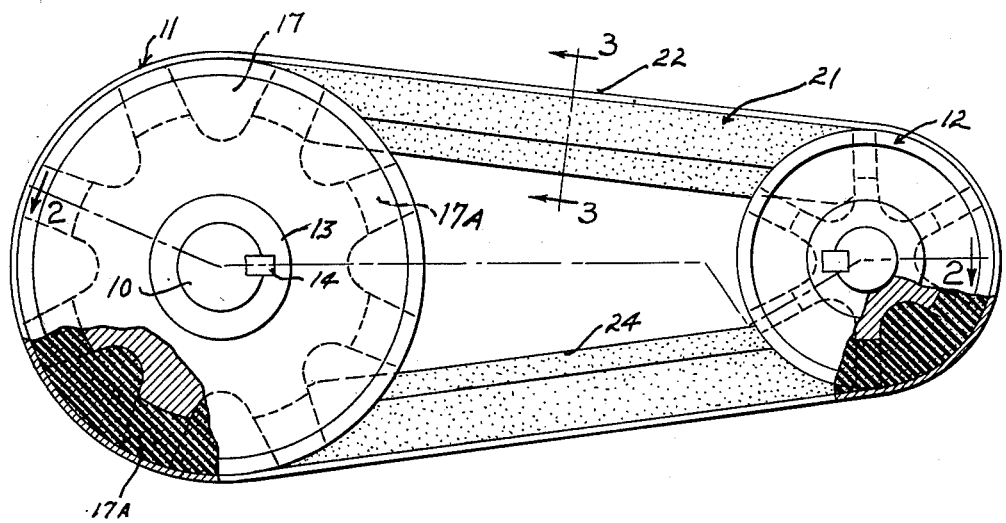
Fig. 1 is a side plan view, partly in section, of the belt drive assembly with the flexible belt under tension.

The belt drive assembly as shown by the drawing includes a pair of shafts 10 and two pulleys 11 and 12, either capable of being the driving or the driven unit. Since the pulleys are or may be of identical construction except for differences in diameter and number of pockets, a detailed description of one will suffice for both.

Figure 2:
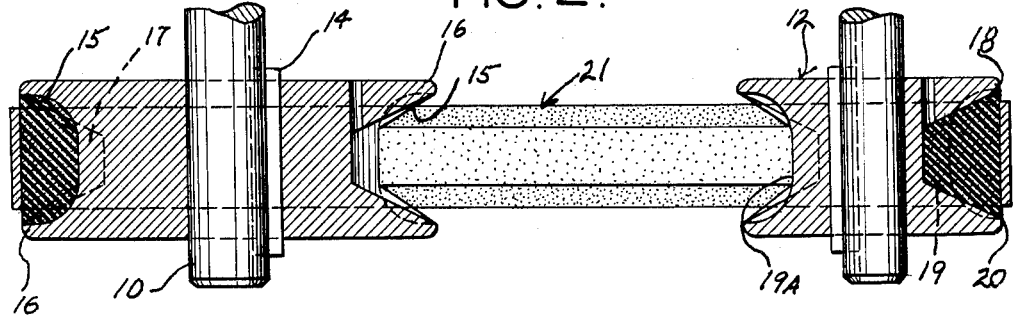
Fig. 2 is a sectional view of the assembly of Fig. 1, as taken along staggered planes indicated by line 2—2 of Fig. 1.
Figure 3:
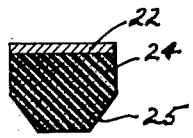
Fig. 3 is a sectional view of the flexible belt, with the thickness of the sheet metal band exaggerated, taken on line 3—3 of Fig. 1.

The pulley 11 consists of a hub 13 and a key 14 to secure the pulley to the shaft 10. About the periphery of the pulley 11 is a curvilinear channel or belt seat 15, the depth of which as shown is approximately one-half the thickness of the belting in its unstressed condition, the belting per se being later herein described, and the width of the channel being considerably in excess of the belting in the same unstressed condition. The outer margins of this channel 15 form the flange 16 of the pulley 11. From the edges of the flange 16 there are a plurality of spaced recesses or wells 17. These wells 17 are characterized by a trapezoidal cross section, as shown by Fig. 2, in a plane parallel to and including the axis of the shaft 10, and the lower converging portions thereof have a rounded concave cross section as shown in Fig. 1 in the plane through the pulley 11 normal to the axis of the shaft 10. It is preferable that the depth of these wells 17 be approximately one-half greater than that of the annular channel 15. It will be noted that the spacing of pockets or wells 17, results in intervening, more shallow pockets 17A.

The companion pulley 12 is of the same construction except for its diameter and number of pockets. In this second pulley, the peripheral channel is indicated by 18, the pockets 19 and 19A, and the pulley flanges 20.

Working in cooperation with the pulley construction is the novel belt designated generally at 21, that is comprised of two component parts. The outermost element consists of a thin, flexible, endless, sheet metal band 22. This substantially non-stretchable reinforcing band is necessary to hold the belt in its operative position because of the usually low tensile strength of the rubber or rubber-like material used for the pulley gripping portion of the belting.

Figure 4:
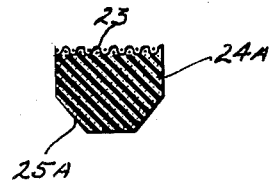
Fig. 4 is a sectional view of the flexible belt taken on line 3—3 of Fig. 1 illustrating a woven or mesh wire band in lieu of a tension layer of sheet metal.

Other non-stretchable materials may be used for the band portion 22 as indicated in Fig. 4 illustrating the employment of woven, braided, stranded or mesh wire 23. Securely bonded as by vulcanizing to the metal reinforcing band 22 or to the strip 23, is a highly compressible, porous or cellular rubber or rubber-like material 24. This gripping material 24, immediately beneath the flexible metal band 22 is of the same width as the band through approximately the upper or outer one-half of its thickness. The lower portion 24 converges inwardly, giving the inner half 25 of the rubber-like material a trapezoidal cross section as shown. In Fig. 4, the corresponding portions are noted at 24A and 25A.

The width and depth of the highly compressible material 24 should be so determined that when under moderate tension, the material 24 will expand laterally in being compressed depthwise to fill the wider portions of the peripheral channel 15, particularly the pockets 17A or 19A, as shown by the cross section of the left hand pulley 11 of Fig. 2, and will expand depthwise in being compressed laterally by the inwardly converging walls of the trapezoidal pockets 19 as shown by the cross section of the right hand pulley 12 of Fig. 2, in which the intervening wider but more shallow pockets are shown at 19A.

The resilience of the pulley gripping material 24 of the belting must be of such a nature to permit easy compression to reduce its unstressed thickness by at least one-third, and it is preferable that it be such that easy compression will reduce its unstressed thickness by one half. Throughout the present description of the material 24 as a highly compressible, porous or cellular rubber, sponge rubber, synthetic rubber, or rubber-like material, it is not intended that these designations be restrictive as to materials, but rather as indicative of the general characteristics of the materials desired.

When in an unstressed condition, and in operative position over the pulleys 11 and 12, the belt rides lightly in the peripheral channel 15. When the belt 21 is put under stress or moderate tension, the operating effect on the belt, as to any given portion of the highly compressible material 24, is to compress same depthwise, then laterally to expand same filling the shallow pockets in channel 15, then again "flowing" into the deeper pockets or wells 17 by expanding depthwise. This alternate lateral and depthwise compression, occurs as the softer material flows into then out of the succession of pockets as the belting engages them. It is this belting action that permits quiet efficient operation of the belt drive assembly and approximates a positive drive condition found in certain types of chain drive assemblies. It is this alternating compression and expansion, first laterally and then depthwise, that also permits the belting 21 to "breathe" and thus to remain cool while operating under any reasonable load. The highly porous gripping material 24 absorbs air as it expands and expels air as it is compressed, thereby rapidly dissipating the internal heat of the belting to the surrounding air.

While I have shown only the preferred form of my invention and a minor modification, it should be understood that various changes or modifications may be made within the fair scope of the claims hereto appended, without departing from the spirit of the invention.

I claim as my invention:

1. A power transmission belting for use with pocketed pulleys, and belting including an outermost readily flexible element of substantially inelastic material, and an element of highly compressible rubber-like stock, the said stock characterized by a compressibility in depthwise and transverse directions of at least one-third, the said stock being highly porous and profusely cellular, thereby adapting any given portion of the highly compressible stock for alternating compression and expansion, first laterally and then depthwise as the belt operates over the pulleys, whereby to approximate a positive drive condition, and to permit the whole layer of porous, cellular, highly compressible stock to breathe, said elements being secured together substantially over their adjacent surfaces.

2. In a power transmission belt for use with pocketed pulleys, an outermost readily flexible metal backing band, a highly porous, profusely cellular, highly compressible stock of a rubber-like material bonded to said band, the cellular stock having its exposed surfaces open for permitting complete aeration of the stock as the belt operates over the associated pulleys, the layer of said porous stock being of a lesser sectional area in its inner portions, than in the regions adjacent the said band, the said stock being characterized by an easy compressibility in depthwise and in transverse directions, of at least one-third, thereby adapting any given portion of the highly compressible stock to be compressed depthwise and expanded laterally, and subsequently compressed laterally and expanded depthwise as the belt operates over the pulleys, whereby to approximate a positive drive condition, and to permit the whole layer of porous, cellular, highly compressible stock to breathe.

CHARLES I. PLACE.

References Cited in the file of this patent

UNITED STATES PATENTS

| Number | Name | Date |
|---|---|---|
| 893,780 | Butler | July 21, 1908 |
| 1,818,798 | Freedlander | Aug. 11, 1931 |
| 1,847,177 | Freedlander | Mar. 1, 1932 |
| 2,067,400 | Koplin | Jan. 12, 1937 |
| 2,411,027 | Crosby | Nov. 12, 1946 |

FOREIGN PATENTS

| Number | Country | Date |
|---|---|---|
| 15,754 | Great Britain | A. D. 1891 |